Patented May 9, 1950

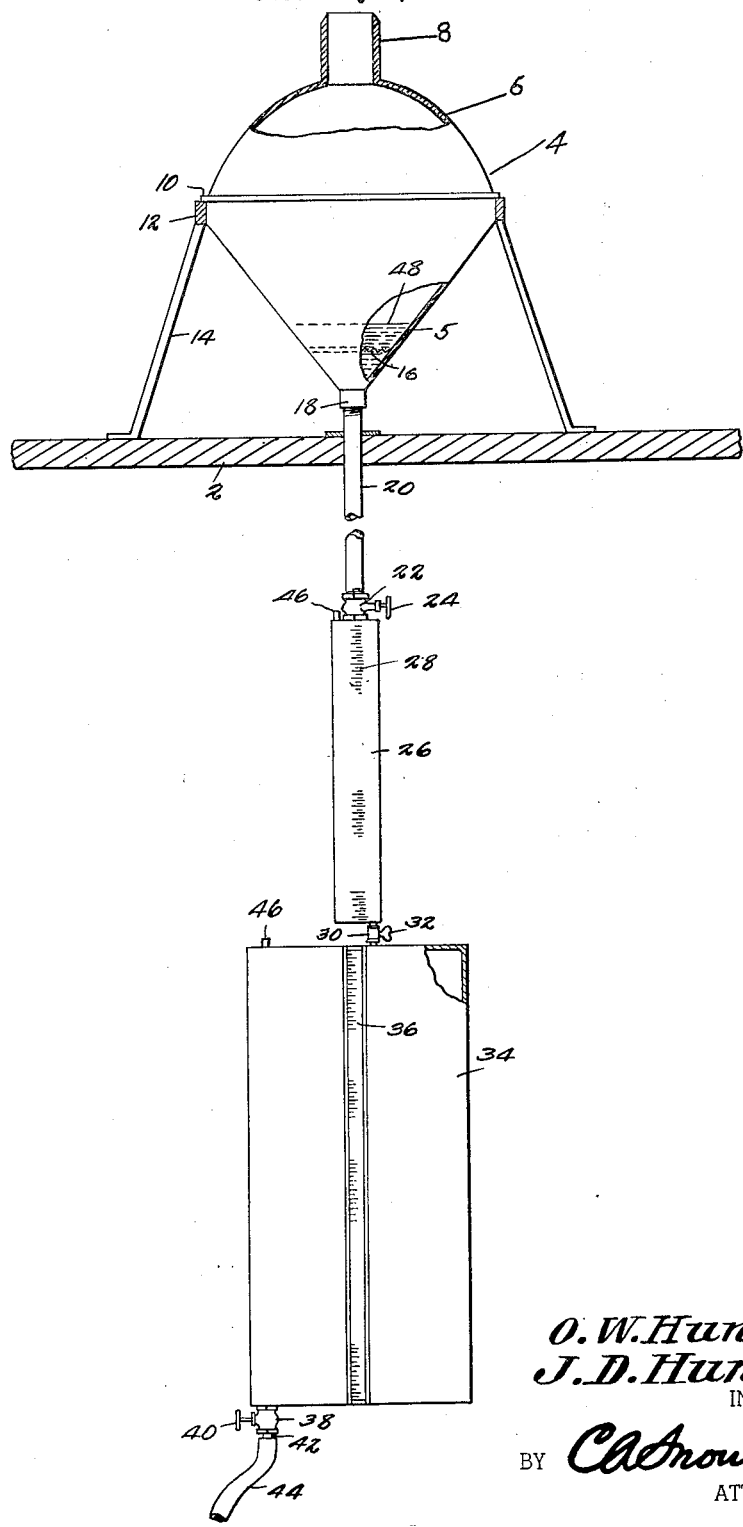

2,507,206

UNITED STATES PATENT OFFICE 2,507,206

RAIN GAUGE

Oliver W. Hunn, Rhome, and Jack D. Hunn, Boyd, Tex., assignors of one-third to Victor B. Acers, Fort Worth, and one-fourth to Herbert S. Hilburn, Plainview, Tex.

Application May 1, 1947, Serial No. 745,259

1 Claim. (Cl. 73—171)

Our present invention relates to an improved rain gage and more especially to the device designed to accurately measure precipitation currently and cumulatively.

In the conventional gages now in use, it is customary for the observer to measure the trapped moisture in a container by using a stick or ullage rod. This method is inaccurate because of the necessary transfers of water from one container to another, because of loss by evaporation, and because of loss by adherence of the liquid to the walls of the container above the water level.

It is our purpose to make available a rain gage which will accurately indicate constantly the current precipitation for any desired period, and a cumulative gage for past periods.

In the accompanying drawings we have illustrated one complete example of the physical embodiment of our invention according to the best mode we have thus far devised, but it will be understood that various changes and alterations may be made in the exemplified structure within the scope of the appended claim.

In the drawings the figure is an elevational view of the gage of our invention.

Referring now to the drawings wherein we have illustrated the present preferred embodiment of the preferred form of our invention we employ a base 2 of suitable material and form. A pear shaped catch container 4 has a funnel shaped base 5 and a hemispherical top 6 and an open tubular extension 8 thereabove. An exterior rib 10 is supported by the ring 12 and its supporting legs 14 from the base 2.

Within the funnel container we place a screen 16 above the outlet 18 and a pipe 20 connects with outlet collar and extends through the base.

A valve casing 22 has an actuator 24 and the casing connects with a cylinder 26 of transparent material and the exterior is provided with graduated markings 28.

A valve casing 30 has an actuator 32 and is positioned between the cylinder 26 and a large cylinder 34 having scale graduations 36 therein.

An outlet valve casing 38 has an actuator 40 and the nipple 42 is inserted in a drain hose 44. The cylinders are provided with air vents 46 to permit the escape of air as the cylinders fill.

In use the funnel bottom 5 and the cylinder 26 and the intermediate piping are filled with an oil to the level 48 above the scum. As precipitation is caught by the upper extension 8 and directed toward the funnel base, the water will pass through the oil and the scum into pipe 20 and into cylinder 26. The oil level will raise and the water will settle to a perfect level with a meniscus under pressure of the head of oil and may be read through the transparent cylinder.

Assuming the cylinder 26 to be of sufficient capacity for an average monthly fall, the amount of water may be read periodically and at the end of the month, the water is drained into the large cylinder 34 for an annual catch. The oil level will, of course, lower and the cycle is repeated.

The use of oil will prevent evaporation and will also prevent water from adhering to the walls of the containers or pipes and will therefore accurately show the amount of water in the gage. The gage is normally graduated to show without figuring the precipitation in inches so that the amount read on the scales is the actual amount of precipitation during any period.

Having thus fully described our invention what we claim as new and desire to secure by Letters Patent is:

A precipitation gage comprising an open container to receive precipitation, a transparent graduated cylinder disposed below the container, a pipe establishing communication between the container and transparent cylinder, a manually controlled valve controlling the flow of precipitation from the pipe to the cylinder, a graduated lower receiving cylinder supported under the transparent graduated cylinder, a pipe connecting the cylinders, a valve controlling the passage of fluid from the transparent cylinder to the lower receiving cylinder, said transparent cylinder containing a liquid of lower specific gravity than water, whereby the precipitation will flow by gravity through the fluid, displacing the fluid in the precipitation cylinder.

OLIVER W. HUNN.
JACK D. HUNN.

REFERENCES CITED

The following references are of record in the file of this patent:

UNITED STATES PATENTS

| Number | Name | Date |
| --- | --- | --- |
| 1,173,022 | Patterson | Feb. 22, 1916 |
| 1,407,068 | Johnson | Feb. 21, 1922 |
| 1,979,705 | Raymond | Nov. 6, 1934 |
| 2,213,888 | Ross | Sept. 3, 1940 |
| 2,321,976 | Black | June 15, 1943 |

FOREIGN PATENTS

| Number | Country | Date |
| --- | --- | --- |
| 10,879 | Great Britain | A. D. 1908 |